United States Patent Office 3,219,727
Patented Nov. 23, 1965

3,219,727
THERMALLY STABILIZED OXYMETHYLENE
POLYMERS
Raymond J. Kray, Berkeley Heights, and Thomas J. Dolce, Springfield, N.J., assignors to Celanese Corporation of America, New York, N.Y., a corporation of Delaware
No Drawing. Filed Mar. 4, 1963, Ser. No. 262,348
23 Claims. (Cl. 260—874)

This invention relates to polymers which are structurally related to polyoxymethylene and particularly to polymers of high thermal stability. This invention also relates to a method for improving the thermal stability of polymers. This application is a continuation-in-part of our application Serial No. 841,690, filed September 23, 1959, now abandoned.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain catalysts such as boron fluoride, coordinate complexes of boron fluoride and organic compounds as described in U.S. Patents 2,989,505; 2,989,506; 2,989,507; 2,989,509; all of which are by Donald E. Hudgin and Frank M. Berardinelli; 2,989,510, by George J. Bruni, and 2,989,511 by Arthur W. Schnizer are also pertinent. All the above patents are assigned to the same assignee as the subject application.

Although polyoxymethylenes prepared by some methods are much more stable against thermal degradation than those prepared by other methods, it is nevertheless desirable for many uses that the thermal stability be increased.

In accordance with the present invention the heat stability of oxymethylene polymers is enhanced by the incorporation therein of a vinyl polymer having side chains containing the structure

and particularly containing groups of the class consisting of amide groups and lactam groups.

The vinyl polymers which may be used include homopolymers and copolymers of vinyl pyrrolidone, vinyl 2-methyl pyrrolidone, homopolymers and copolymers of acrylamide and substituted acrylamides, N-vinyl caprolactam, N-vinyl α-piperidone, N-vinyl N-methylacetamide, N-allyl and N-methallyl amides and N-vinyl-N-phenylacetamide.

The vinyl polymers used are usually of molecular weights above about 10,000 and preferably between about 20,000 and 500,000. When vinyl copolymers are used, it is preferred that at least 25% of the vinyl units have pendant chains including

groups. The

structures are preferably bonded solely to atoms of the group consisting of carbon and hydrogen atoms with at least one bond of said structure being attached to a carbon atom and the remaining atoms of each of the pendant chains consisting entirely of atoms of the group consisting of carbon, hydrogen and oxygen atoms.

Among the specific polymers which may be used are homopolymers of vinyl pyrrolidone; copolymers of vinyl pyrrolidone with other vinyl monomers, including other monomers containing

groups and monomers which do not contain such groups, such as vinyl acetate, styrene, methyl, ethyl and butyl acrylate, methyl methacrylate, vinyl carbazole, sodium acrylate, methacrylonitrile and acrylonitrile; homopolymers and copolymers of acrylamide, including polymers aftertreated, such as by methylolation to effect substitutions on the pendant chains; homopolymers and copolymers of substituted acrylamides, such as N-tertiary butyl acrylamide; homopolymers and copolymers of methacrylamide and substituted methacrylamides; homopolymers and copolymers of N-vinyl caprolactams, N-vinyl α-piperidones, N-vinyl acetanilides, N-vinyl, N-methylacetamide and N-allyl and N-methallyl amides, and N-vinyl n-phenylacetamide.

In accordance with a preferred embodiment of this invention the aforesaid vinyl polymer compound is incorporated into an oxymethylene polymer containing carbon-to-carbon single bonds in the main polymer chain. In a particularly preferred embodiment of our invention the vinyl polymer compounds are incorporated in an oxymethylene copolymer having at least one chain containing recurring oxymethylene (—OCH$_2$—) units interspersed with —OR— groups in the main polymer chain where R is a divalent radical containing at least two carbon atoms directly linked to each other and positioned in the chain between the two valences with any substituents on said R radical being inert, that is those which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which are utilized in accordance with this aspect of the invention are those having a structure comprising recurring units having the formula

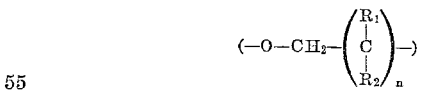

wherein $n$ is an integer from zero to 5 and wherein $n$ is zero in from 60 to 99.6 percent of the recurring units. $R_1$ and $R_2$ are inert substituents, that is, substituents which will not cause undersirable reactions.

A preferred class of coplymers are those having a structure comprising oxymethylene and oxyethylene recurring units wherein from 60 to 99.6 percent of the recurring units are oxymethylene units.

It appears that the susceptibility of oxymethylene polymers to thermal stabilization by the addition of the aforementioned vinyl polymers is enhanced by incorporating into the polymer oxyalkylene units having adjacent carbon atoms and derived from cyclic ethers having adjacent carbon atoms. These copolymers may be prepared by copolymerizing trioxane with a cyclic ether having the structure

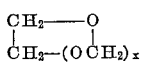

where $n$ is an integer from zero to two.

Examples of preferred polymers include copolymers of trioxane and cyclic ethers containing at least two adjacent carbon atoms such as the copolymers disclosed in U.S. Patent No. 3,027,352.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran and butadiene monoxide.

The preferred polymers which are treated in this invention are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment. For example, if a sample of the treated polymer of this invention is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). The preferred copolymers of this invention exhibit remarkable alkaline stability. For example, if the preferred copolymers are refluxed at a temperature of about 142°–145° C. in a 50% solution of sodium hydroxide in water for a period of 45 minutes, the weight of the copolymer will be reduced by less than one percent.

The preferred catalysts used in the preparation of the desired copolymers are the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be removed for best yields.

In preparing the preferred copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mol of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in Patent No. 2,989,509 of Donald E. Hudgin and Frank M. Berardinelli.

In a preferred embodiment of this invention the polymer composition also contains a phenolic material and preferably an alkylene bisphenol as a thermal stabilizer. It appears that the stabilization action of the vinyl polymers and of the phenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benezene ring, each alkyl substituent having from 1 to 4 carbon atoms. The preferred alkylene bisphenols are 2,2′-methylene bis-(4-methyl-6-tertiary butyl phenol) and 4,4′-butylidene bis-(6-tertiary butyl-3-methyl phenol). Suitable phenolic stabilizers other than alkylene bisphenols include 2,6-ditertiary butyl-4-methylphenol, p-phenylphenol and octylphenol.

The vinyl polymer is generally admixed with the oxymethylene polymer in amounts not exceeding 10%, based on the weight of the oxymethylene polymer, and preferably in amounts between about 0.1 and 1 weight percent. The alkylene bisphenol, when used, is admixed in amounts not exceeding 2 weight percent and preferably from about 0.1 to about 1 weight percent.

The vinyl polymers, and the alkylene bisphenols, if desired, may be admixed intimately with the oxymethylene polymer by being applied in solution in a suitable solvent to the finely divided solid oxymethylene polymer followed by evaporation of the solvent. Methanol is a suitable solvent for polyvinyl pyrrolidone and water is a suitable solvent for methylolated polyacrylamide.

The admixture may also be made by dry blending the finely divided oxymethylene polymer and finely divided stabilizers, by milling the stabilizers into the polymer as the latter is worked on a rubber mill or by dissolving the oxymethylene polymers and the stabilizers in a common solvent, such as gamma butyrolactone, and evaporating the solvent.

The compositions of this invention may also include, if desired, plasticizers, fillers, pigments and other stabilizers, such as those which are stabilizers against degradation by ultra violet light.

EXAMPLE I

Into a 5 liter 3-neck flask fitted with a stirrer, condenser and thermometer were placed 2100 g. of molten and filtered trioxane, 900 g. of cyclohexane and 52.5 g. of 1,3-dioxolane (2.5% based on trioxane). The contents were heated to 60° C. with stirring and after solution was complete 0.63 ml. of $BF_3$· dibutyletherate in 20 ml. of cyclohexane (0.021% based on total mass) was added. The solution became cloudy and after stirring for 4 min. the contents were poured into a jacketed Readco mixer (sigma blade type) where the temperature was controlled at approximately 60° C. 75 minutes after catalyst addition the reaction was cooled and the contents moved into 3 liters of acetone containing 5 ml. of tributylamine. After washing with this solution and filtering, the polymer was washed twice more with acetone, filtered and dried overnight at 65–70° C. The yield of polymer amounted to 57.8% and the dioxolane content was 4.2%.

Three grams of the above described polymer was slurried with a solution containing 0.03 gram of 2,2'-methylene-bis-(4-methyl-6-tertiary butyl phenol) and 0.03 gram of polyvinyl pyrrolidone (average molecular weight—40,000) in 15 ml. of methanol. The slurry was stirred occasionally until the solvent evaporated. Then the polymer was dried and a 3 gram disc was compression molded at 190° C. for 4 minutes at a pressure of 1500 p.s.i. The degradation rate of the molded disc when maintained in an open vessel in a circulating air oven at 220° C. was 0.17%/min. for the first 6% of the polymer and 0.01 weight percent/min. for the remainder. Without stabilizers the polymer had a degradation rate of 1.3 weight percent/min.

EXAMPLES II to IV

A copolymer having 3.8 weight percent of monomeric units derived from dioxolane and 96.2 weight percent of monomeric units derived from trioxane and having a degradation rate (unstabilized) at 222° C. of 2.3 weight percent/min. was treated as described in Example I except that polyvinyl pyrrolidones of various molecular weights were used. The degradation rates were as follows:

*Table I*

| Example No. | Avg. M. W. of Polyvinyl pyrrolidone | Degradation Rate at 222° C. (wt. percent/min.) |
|---|---|---|
| II | 20,000 | 0.23 for 1st 5%; 0.09 for remainder. |
| III | 160,000 | 0.40 for 1st 10%; 0.15 for remainder. |
| IV | 360,000 | 0.32 for 1st 9%; 0.095 for remainder. |

EXAMPLE V

The procedure of Example I was repeated except that methylolated polyacrylamide (having approximately 30% of the amide groups methylolated and having a molecular weight of about 50,000) was substituted for the polyvinyl pyrrolidone on an equal weight basis and that water was used as the solvent in place of methanol. The degradation rate at 222° C. was 0.34 weight percent/min. for the first 6% of the polymer and 0.07 weight percent/min. for the remainder.

EXAMPLE VI

A homopolymer of trioxane was dry blended with 1% each of finely divided polyvinyl pyrrolidone (molecular weight—40,000) and finely divided 2,2'-methylene-bis-(4-methyl-6-tertiary butylphenol). The mixture was then milled in a heated chamber having a pair of counter-rotating screws until the initial unstable portion (about 21%) had volatilized off. The remainder of the polymer had a degradation rate of 0.38 weight percent/min. at 222° C. Prior to the treatment the degradation rate was 4.5 weight percent/min.

EXAMPLE VII

Example VI was repeated, except that in place of the homopolymer, a copolymer was used containing 2 weight percent of monomeric units derived from dioxolane and 98 weight percent of monomeric units derived from trioxane. After volatilization of the initial unstable portion (about 19.8%) the polymer had a degradation rate of 0.07 weight percent/min. at 222° C. The degradation rate before treatment was 4.0 weight percent/min.

EXAMPLE VIII

Example I was repeated except that the 2,2'-methylene-bis(4-methyl-6-tertiary butyl phenol) was omitted and the amount of polyvinyl pyrrolidone was doubled. The degradation rate was 0.86 weight percent/min. for the first 8% and 0.33 weight percent/min. for the remainder.

EXAMPLE IX

The procedure of Example I was repeated except that tht polyvinylpyrrolidone was omitted and the amount of 2,2'-methylene-bis-(4-methyl-6-tertiary butyl phenol) was doubled. The degradation rate was 0.35%/min. for the first 11% of polymer and then 0.07%/min. for the remainder.

EXAMPLE X

A copolymer having 2.5 weight percent of monomeric units derived from dioxolane and 97.5 weight percent of units derived from trioxane and having a thermal degradation rate (unstabilized) of 4 weight percent/min. was milled with 2 weight percent of 4,4' butylidene-bis (6-tertiary butyl-3-methyl phenol) and 5 weight percent of polymethacrylamide (molecular weight about 45,000) at 200°–202° C. for 45 minutes. The degradation rate at 222° C. was reduced to 0.09 weight percent/min. at 222° C.

EXAMPLE XI

Example X was repeated except that a copolymer of 64 weight percent of methacrylamide and 36 weight percent of methyl methacrylate was substituted for the polymethacrylamide. The degradation rate at 22° C. was 0.12%/min. for the first 3.5% of polymer and 0.05%/min. for the remainder.

EXAMPLE XII

Example X was repeated except that a copolymer of 24 weight percent of methacrylamide and 76 weight percent of methyl methacrylate was substituted for the polymethacrylamide. The degradation rate at 222° C. was 0.18 weight percent/min.

EXAMPLE XIII

Example X was repeated except that a copolymer of 75 weight percent of N-methylolacrylamide and 25 weight percent of N-tertiary butylacrylamide was substituted for the polymethacrylamide. The degradation rate at 222° C. was 0.09 weight percent/min. for the first 2.5% of polymer and zero for the remainder.

It is to be understood that the foregoing detailed description is merely given by way of illustration and that many variations may be made therein without departing from the spirit of our invention.

Having described our invention, what we desire to secure by Letters Patent is:

1. A polymer composition comprising an oxymethylene polymer and a stabilizing amount of a vinyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms.

2. The polymer composition of claim 1 wherein said polymer is an oxymethylene copolymer having at least one chain containing at least 60 mol percent recurring oxymethylene (—OCH₂) units interspersed with —OR— groups in the main polymer chain where R is a divalent radical containing at least two carbon atoms directly linked to each other and positioned in the chain between the two valences with any substitutents on the R radical being inert.

3. A polymer composition comprising an oxymethylene polymer and a stabilizing amount of a vinyl polymer having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms, said oxymethylene polymer containing oxyalkylene groups having more than one carbon atom and containing 60 to 99.6 mol percent of oxymethylene groups.

4. A polymer composition comprising an oxymethylene polymer and a stabilizing amount of a vinyl polymer having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms, said oxymethylene polymer containing oxyethylene groups and containing from 60 to 99.6 mol percent of oxymethylene groups.

5. A polymer composition comprising an oxymethylene polymer and stabilizing amounts of (1) a vinyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms, and (2) a phenolic stabilizer.

6. A polymer composition comprising an oxymethylene polymer and stabilizing amounts of (1) a vinyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms, and (2) an alkylene bisphenol.

7. The polymer composition of claim 6 wherein said polymer is an oxymethylene copolymer having at least one chain containing at least 60 mol percent recurring oxymethylene (—OCH₂) units interspersed with —OR— groups in the main polymer chain where R is divalent radical containing at least two carbon atoms directly linked to each other and positioned in the chain between the two valences wtih any substituents on the R radical being inert.

8. A polymer composition comprising (1) an oxymethylene polymer, (2) a vinyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms, and (3) an alkylene bisphenol, said oxymethylene polymer containing oxyethylene groups and containing from 60 to 99.6 mol percent of oxymethylene groups, said alkylene bisphenol being present in amounts between about 0.1% and 2% and said vinyl polymer being present in amounts between about 0.1% and 10%, based on the weight of oxymethylene polymer.

9. The polymer composition of claim 8 wherein said vinyl polymer is a polymer of vinyl pyrrolidone.

10. The polymer composition of claim 8 wherein said vinyl polymer is a polymer of an acrylamide.

11. The polymer composition of claim 10 wherein said vinyl polymer is a polymer of acrylamide.

12. The polymer composition of claim 10 wherein said vinyl polymer is a polymer of methacrylamide.

13. The polymer composition of claim 10 wherein said vinyl polymer is a polymer of methylol acrylamide.

14. The polymer composition of claim 10 wherein said vinyl polymer is a polymer of N-tertiary butyl acrylamide.

15. The polymer composition of claim 8 wherein said alkylene bisphenol is 2,2'-methylene-bis(4-methyl-6-tertiary butyl phenol).

16. The polymer composition of claim 8 wherein said alkylene bisphenol is 4,4'-butylidene-bis(6-tertiary butyl-3-methyl phenol).

17. The method of stabilizing an oxymethylene polymer which comprises nitimtaely admixing therewith a stabilizng amount of a vnyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms.

18. The method of stabilizing an oxymethylene copolymer having at least one chain containing at least 60 mol percent recurring oxymethylene (—OCH₂) units interspersed with —OR— groups in the main polymer chain where R is a divalent radical containing at least two carbon atoms directly linked to each other and positioned in the chain between the two valences with any substituents on the R radical being inert, said method comprises intimately admixing with said oxymethylene copolymer, a stabilizing amount of vinyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms.

19. The method of stabilizing an oxymethylene polymer containing oxyethylene groups and containing from 60 to 99.6 mol percent of oxymethylene groups which comprises intimately admixing therewith (1) a vinyl polymer with at least 25% of its units having side chains containing the structure

said structure being bonded solely to atoms of the group consisting of carbon and hydrogen atoms with at least one bond of said structure being attached to a carbon atom and the remaining atoms of each of said side chains containing said structure consisting entirely of atoms of the group consisting of carbon hydrogen and oxygen atoms, and (2) an alkylene bisphenol, the amount of alkylene bisphenol being between about 0.1% and 2% and the amount of vinyl polymer being between about 0.1% and 10%, based on the weight of oxymethylene polymer.

20. The method of claim 19 wherein said vinyl polymer and said alkylene bisphenol are applied in solution to said oxymethylene polymer in finely divided state and the solvent of said solution is thereafter evaporated.

21. The method of claim 19 wherein said vinyl polymer and said alkylene bisphenol are compounded in a mill with said oxymethylene polymer in plastic state.

22. A polymer composition comprising an oxymethylene polymer and from about 0.1% to about 10% based on the weight of oxymethylene polymer of a vinyl polymer with at least 25% of its units having side chains containing carbonamide groups bonded solely to atoms of the group consisting of carbon and hydrogen, at least one bond being to a carbon atom, the remaining atoms of each of said side chains consisting entirely of atoms of the group consisting of carbon, hydrogen and oxygen atoms.

23. The composition of claim 22 wherein said oxymethylene polymer is a trioxane polymer.

References Cited by the Examiner
UNITED STATES PATENTS

| | | | |
|---|---|---|---|
| 2,844,561 | 7/1958 | Bechtold et al. | 260—67 |
| 2,947,728 | 8/1960 | Bartz | 260—67 |
| 2,966,476 | 12/1960 | Kralovec et al. | 260—67 |
| 3,103,499 | 9/1963 | Dolce et al. | 260—67 |

MURRAY TILLMAN, *Primary Examiner.*